United States Patent [19]

Oesterlin et al.

[11] 4,005,292
[45] Jan. 25, 1977

[54] MASS COUNTING OF RADIOACTIVITY SAMPLES

[75] Inventors: Donald L. Oesterlin, Roselle; Raymond F. Obrycki, Mount Prospect, both of Ill.

[73] Assignee: G. D. Searle & Co., Skokie, Ill.

[22] Filed: May 12, 1975

[21] Appl. No.: 576,343

Related U.S. Application Data

[63] Continuation-in-part of Ser. No. 436,101, Jan. 24, 1974, abandoned.

[52] U.S. Cl. .............................. 250/364; 250/328; 250/366; 250/367
[51] Int. Cl.² ...................... G01T 1/00; G01T 1/20
[58] Field of Search .......... 250/328, 366, 338, 361, 250/362, 303, 364, 367

[56] References Cited

UNITED STATES PATENTS

| | | | |
|---|---|---|---|
| 3,270,202 | 8/1966 | Long et al. ...................... | 250/328 |
| 3,509,339 | 4/1970 | Doehner ........................... | 250/338 |
| 3,723,735 | 3/1973 | Spelha et al. ................... | 250/227 X |
| 3,723,736 | 3/1973 | Laney ............................... | 250/361 |
| 3,732,419 | 5/1973 | Kulberg et al. .................. | 250/366 |
| 3,796,879 | 3/1974 | Obrycki ........................... | 250/362 |

*Primary Examiner*—Harold A. Dixon
*Attorney, Agent, or Firm*—Walter C. Ramm; Dennis O. Kraft; Peter J. Sgarbossa

[57] ABSTRACT

A method and apparatus for concurrently counting a plurality of radioactive samples. The position sensitive circuitry of a scintillation camera is employed to sort electrical pulses resulting from scintillations according to the geometrical locations of scintillations causing those pulses. A scintillation means, in the form of a scintillating crystal material or a liquid scintillator, is positioned proximate to an array of radioactive samples. Improvement in the accuracy of pulse classification may be obtained by employing collimating means. If a plurality of scintillation crystals are employed to measure the iodine-125 content of samples, a method and means are provided for correcting for variations in crystal light transmission properties, sample volume, and sample container radiation absorption.

2 Claims, 7 Drawing Figures

MASS COUNTING OF RADIOACTIVITY SAMPLES

This invention relates to a method and apparatus for concurrently measuring the radioactivity of a plurality of radioactive samples, and is a continuation-in-part of application Ser. No. 436,101, filed Jan. 24, 1974, now abandoned. The samples measured may either be liquid scintillation samples in which beta rays produce scintillations in a liquid scintillator contained therein, or gamma emitting samples in which gamma rays pass from the sample and are detected externally thereof by a scintillation crystal detector.

BACKGROUND OF THE INVENTION

A variety of approaches have been used for the purpose of detecting the radioactivity levels in large numbers of radioactive samples. The sample material to be analyzed typically consists of some biological substance containing a source of radioactivity. The extent of the existence of the radioactivity conveys certain information useful, for example, in medical research or diagosis. In liquid scintillation analysis, for example, laboratory animals ingest certain substances labeled with radioactive tracers, typically carbon-14 or tritium. The proclivity of these substances to migrate to certain biological organs or parts thereof is indicative of the degree to which the particular substance under study seeks the organ involved, or is indicative of the medical status of the organ. In any event, portions of the organ may thereafter be dissolved in a solvent to which a liquid scintillator is added. Beta rays from the radioisotopes in the organ cause flashes of light to be emitted by the scintillator in a transparent vial or test tube. The flashes of light, or scintillations, are counted using one or more photomultiplier tubes in order to determine the level of radioctivity of the sample under study. Typical laboratory research results in a requirement for processing several hundred liquid scintillation samples at a time.

Similarly, gamma emitting samples are required in large numbers in clinical medical diagnosis. One purpose for which such samples are typically prepared is for use in radioimmunoassay. In radioimmunoassay, or other competitive binding types of assays, an antigen is added to a serum containing a specific antibody. The antigen and antibody combine and precipitate from the solution. Some of the antigen used in the reaction is combined with or "labeled" with a radio-isotype, typically iodine-125. The radioisotope is chosen in such a manner that it will not interfere with the tendency for the antigen to combine with specific antibody. The antigenantibody complex may be separated from the excess antigen, and the portion of this complex which is radioactive will determine the amount of antigen initially present. A description of a specific application of radioimmunoassay may be found in an article by Catt, Niall, and Tregear, "Solid-Phase Radioimmunoassay of Human Growth Hormone", *Biochem. Journal*, 100, pp. 316–336 (1966).

While measurement of radioactive samples has been described heretofore in terms of its use in biological research and clinical laboratories, such applications are not limiting as to the scope of the present invention. Radioactive samples may be measured according to the present invention in connection with other types of radioactivity determinations. For example, the present invention could be applied to samples derived from gas or liquid chromatography units, or for the purpose of determining mineral content in geological samples, for determining wear in moving parts in the testing of engines, for charting air and sea currents in weather prediction, and for a host of other applications. The common element in each of these applications is that a number of separate and discrete radioactive samples are produced for analysis.

It is an object of the present invention to concurrently measure the radioactivity level in a plurality of radioactive samples. Heretofore, the measurement of radioactive samples has taken place sequentially is typified by the planchett counter disclosed in U.S. Pat. No. 2,843,753, and by the serpentine conveyor system disclosed in U.S. Pat. No. 3,206,006 for use in liquid scintillation and gamma counting. In this type of prior art radioactivity measurement, discrete samples are transported to a sample measurement station where the level of radioactivity of each sample is measured. When measurement is complete for one sample, that sample is advanced and replaced by a subsequent sample. Some attempts have been made to concurrently analyze the radioactivity from more than one sample. For example, U.S. Pat. No. 3,723,736 discloses a means and method for analyzing a plurality of liquid scintillation samples concurrently. However, this system still contemplates a serpentine conveyor to bring groups of samples to a sample measurement station where each of the samples in a group are concurrently measured. The disclosure in U.S. Pat. No. 3,855,473 illustrates a system in which the sample detection station is sequentially brought to a group of samples to concurrently measure each of the samples in that group. Again, as in the other systems described, the radioactivity detecting mechanism must advance sequentially measuring only a very small group of sample concurrently, and an elaborate mechanical apparatus for effecting relative and sequential movement between samples and a sample measurement station is necessary.

Accordingly, it is an object of the present invention to measure concurrently a plurality of discrete radioactive samples in a manner which eliminates the sequential processing of single samples or groups of samples within a total set. The elimination of sequential and recurring cycles of sample measurement provides enormous savings in time in sample analysis. That is, if an average of n seconds is required to analyze a single sample, and three hundred samples must be analyzed, the device of the present invention will analyze all of these samples in only slightly more than n seconds. Conversely, a sample measurement device that measures samples in groups of three would require 100n seconds for the same processing, while a sample analyzing device measuring single samples sequentially would require 300n seconds.

It is a further object to concurrently measure the radioactivity of a plurality of samples with virtually no increase in measuring time required for additional samples. That is, continuing the previous examples, the device of the present invention could measure 500 samples in approximately n seconds, practically the same amount of time as would be required to measure 300 samples. Conventional devices would require an increased processing time proportional to the number of additional samples.

Another object of the present invention is the elimination of the requirement for moving either the samples or the sample measurement station during the sample measuring process. The elimination of sample movement does away with problems of sample spillage and breakage, and increases reliability by eliminating entirely the complex and expensive mechanical transport system characteristic of conventional devices. Accordingly, the present invention does not require a serpentine conveyor system nor a mechanism for moving the sample measuring station relative to the samples to be measured. Instead, in some forms of the invention, the samples are fixed relative to the radiation detecting mechanism for the duration of the processing cycle. The samples need only be positioned for measurement and removed once counting is complete for all of the samples. There is thus no delay incurred in sample measurement for manipulation of either the samples or the sample detecting station between cycles of measurement.

A further object of the preferred practice of the invention is to increase the accuracy of the results obtained. Accordingly, collimation is provided so that electrical pulses caused by radiation from one sample are not attributed to a different sample. A collimator interposed between the samples and the detector will aid in the prevention of erroneous attribution of signal pulses. In addition for the important and specific application of the present invention where the radioisotope to be measured is iodine-125, and where a plurality of scintillation crystals are utilized as the scintillation means, there is disclosed herein a unique technique of correcting for certain inherent problems. Specifically, it is well known that scintillation crystals formed of the same material and of identical geometric size and configuration still will have variances in their optical transmission properties. It is also known that such physically identical crystals exhibit slight differences in responsiveness to incident radiation. Moreover, individual samples to be measured will exhibit certain differences which will affect the detected count rate of radioactive events. These effects result from such differences as variations in sample volume and variation in wall thickness and radiation absorption in the sample containers.

Accordingly, it is a further object of the presentation to provide a method and means for correcting for the foregoing problems so that a corrected count of actual radioactive disintegrations can be determined for each sample despite the existence of such differences and variations.

SUMMARY OF THE INVENTION

In one broad aspect, this invention is a method of concurrently measuring radiation in each of a plurality of discrete samples comprising: positioning a plurality of discrete samples at spaced intervals and predetermined stationary locations in a two dimensional matrix proximate to scintillation transducing means for generating signals indicative of the detection of quanta of radiation by said detector and the position of the quanta of radiation by said detector and the position of the quanta so detected in said two dimensional matrix, classifying the aforesaid signals according to position in the aforesaid two dimensional matrix, and concurrently registering separately the signals received within each classification.

The invention may also be thought of in terms of a device for concurrently analyzing the radioactivity of a plurality of discrete radioactive samples comprising: a transducer assembly having responsive elements positioned in an array with overlapping fields of view to produce electrical pulses in response to detected radioactive events, means for processing the electrical pulses to produce output signals indicative of the positions of radioactive disintegrations relative to said array of elements, sample retaining means positioned with respect to said transducer assembly for accommodating the aforesaid radioactive samples at predetermined stationary positions within a matrix, signal sorting means for associating each of the aforesaid signals with a single one of the aforesaid predetermined sample positions within said matrix, and signal tabulating and registration means for concurrently and separately counting the signals associated with each of the aforesaid sample positions.

BRIEF DESCRIPTION OF THE INVENTION

The various aspects of the present invention may be further illustrated by reference to the accompanying drawings in which:

FIG. 1 schematically illustrates the placement of photodetectors in an array of photodetectors.

DETAILED DESCRIPTION OF THE INVENTION

Figure 2:
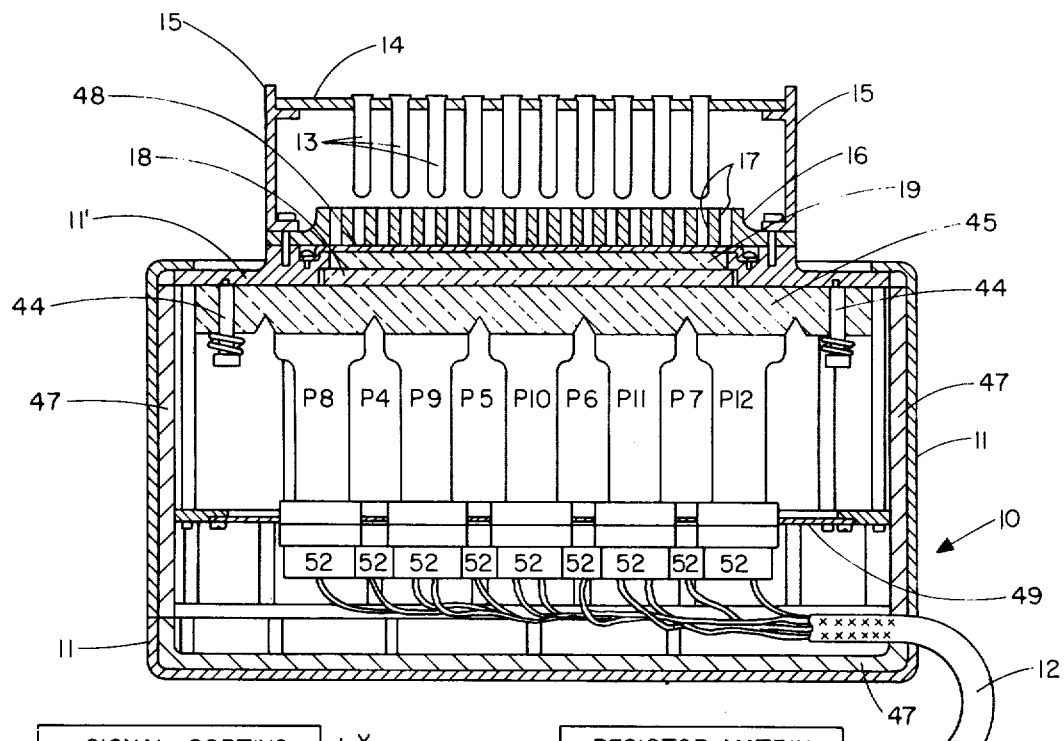
FIG. 2 is an elevational diagram, partially in section, of a device constructed according to the present invention.
Figure 2:
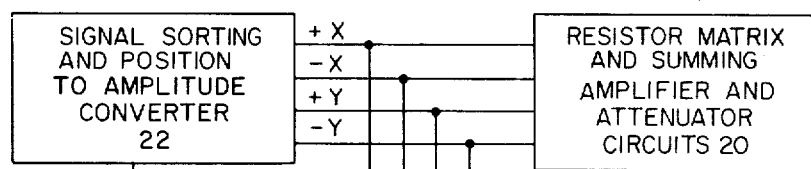

Referring now to FIG. 2, there is illustrated a sample analyzing device according to this invention in one basic form for concurrently analyzing the radioactivity of a plurality of discrete samples 13. The invention includes a transducer assembly with responsive elements, which in this embodiment of the device employs certain subcombinations of elements of a scintillation camera. The scintillation camera is described in detail in U.S. Pat. No. 3,011,057, which depicts a radiation detecting device in wide commercial use for locating a radiation source in a two dimensional coordinate system. This device is used to rapidly project an image of the distribution of radioactivity throughout an object under investigation, such as an organ of a living subject which has ingested a diagnostic quantity of a radioactive isotope. A scintillation camera of this type produces a picture of the radioactivity distribution by detecting individual gamma rays emitted from the distributed radioactive isotope and passing through a collimator to produce scintillation in a thin planar scintillating crystal. These scintillations are detected by an array of individual photomultiplier tubes spaced from and viewing overlapping areas of the crystal. Appropriate electronic circuits translate the outputs of the individual photomultiplier tubes into $x$ and $y$ coordinate signals and a $z$ signal which indicates whether or not the energy of a scintillation event falls within a selected energy window. A visual display of the radioactive distribution in the object is obtained by coupling the $x$, $y$ and z signals to a cathode ray oscilloscope or other image display device, where the individual scintillation events are displayed as small spots of light positioned in accordance with the x and y coordinate signals.

It has been discovered according to the present invention that the scintillation detector 10 of a scintillation camera may be employed to concurrently analyze the radioactivity of a plurality of discrete samples 13. The scintillation detector 10 is equipped with a scintillation crystal assembly employing an encapsulated scintillation crystal 18 in the form of a disc of thallium-activated sodium iodide. The expansive dimension of scintillation crystal 18 defines the plane of a two-dimensional coordinate system. Photodetectors P1 through P19 view overlapping portions of the scintillation crystal 18, and are spaced therefrom by a light pipe 45. A glass cover disc 19 is held in contact with the scintillation crystal assembly by means of spring biased bolts 44 which extend through the light guard 45 and into the element 11' of steel frame 11. Radiation shielding 47, comprised of lead or other radiation absorbing material is positioned within the steel frame 11 to protect the scintillation crystal 18 from extraneous radiation. An aluminum shield 48 covers the face of the scintillation crystal 18 and is bolted to the frame 11.

Figure 1:
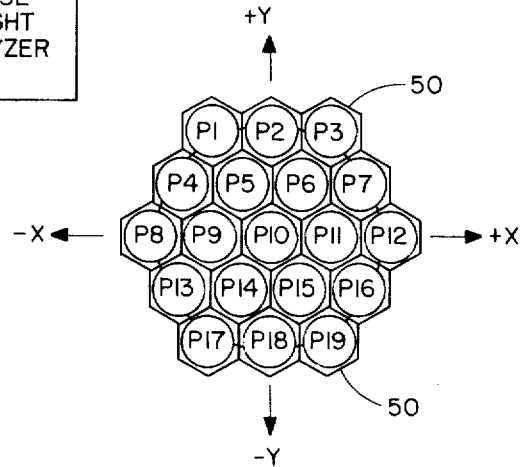
Figure 3:
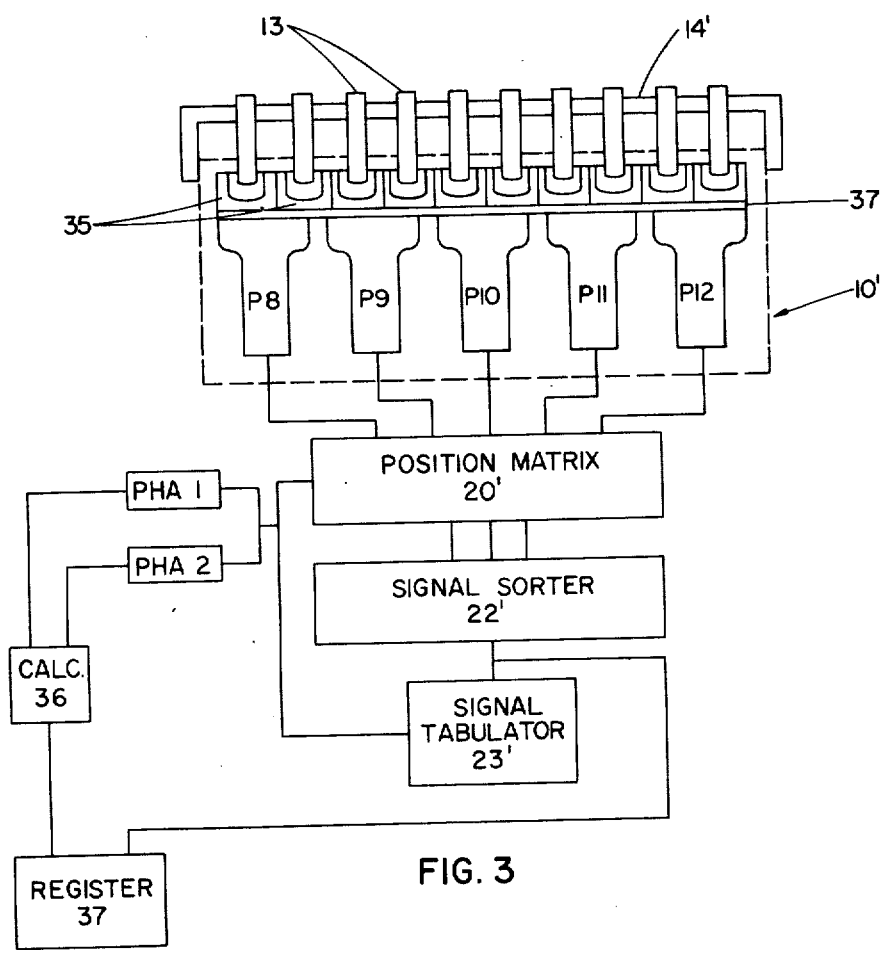
FIG. 3 is a device according to the present invention constructed for counting radioactivity in samples containing iodine-125.
Figure 5:
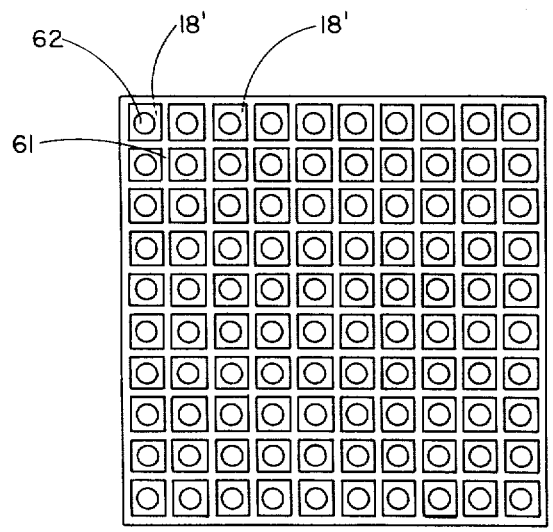
FIG. 5 is a plan view of a portion of the embodiment of FIG. 3.
Figure 6:
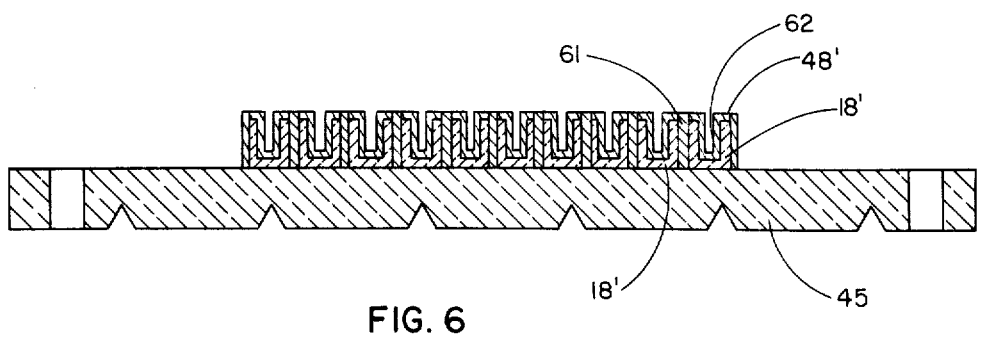
FIG. 6 is an elevational view of the embodiment of FIG. 5 in conjunction with a light guide.

The photodetectors P1 through P19 are arranged as indicated in FIG. 1 and are normally spring biased into intimate contact with the light guide 45 by coil springs which are positioned about each of the photomultiplier tubes and maintained in compression by a restraining plate 49. These springs have been omitted to improve the clarity of the illustration of FIG. 2. While the scintillation crystal assembly has been described as being comprised of a single crystal 18, a plurality of smaller, separate crystals could be substituted for the single large crystal depicted. Such an alternative arrangement is illustrated in FIGS. 3, 5 and 6 in which a ten by ten matrix of well-type crystal elements 35 are used in lieu of a single crystal to form the scintillation crystal assembly. The crystal elements 35 have uniform lateral dimensions and are contiguously positioned in optical isolation from each other in a two dimensional array. Each of the scintillation crystals 18' of the separate elements 35 has a circular bore 62 extending from the top to the interior thereof. The crystals 18' are surrounded at all surfaces (except the surface in contact with the light pipe 45) by aluminum shielding 48' and aluminum partitioning 61 which optically isolates the elements 35 from each other. This arrangement of this embodiment may be cheaper than that of FIG. 2 which utilizes a single large crystal.

The photomultiplier tube arrangement and associated circuitry of FIG. 2 is common to both embodiments, however. In this arrangement the output ends of the photomultiplier tubes are each plugged into an electrical socket 52 wherein there is located a preamplifier. The electrical connectors from the preamplifiers of each of the photomultipliers are gathered into a harness 12 which is used to connect the detector 10 to calculator means for generating signals indicative of the positions of coordinates of scintillations occurring in the crystal 18 (or crystal elements 35) relative to the two dimensional coordinate system depicted in FIG. 1. To be used for the purpose intended according to this invention, the scintillation camera system depicted in FIG. 2 must be modified from conventional systems. More specifically, a sample retaining means must be added and mounted in a fixed position relative to the scintillation detector. The sample retaining means 15 is positioned relative to the scintillation crystal 18 for accommodating a tray 14 containing samples 13 depending therefrom at predetermined spaced positions within a matrix defined by the apertures of tray 14.

The transducer means of this embodiment of the invention is formed by the scintillation detector 10 and the electrical circuitry indicated at 20, 21 and 22. The circuitry 20 includes a resistor matrix as well as summing amplifier and attenuator circuits. The preamplifiers in the sockets 52, along with the resistor matrix and summing and attenuator circuitry 20 and the gate pulse former and pulse height analyzer 21, form means for processing the electrical signals from the photomultipliers P1 through P19 to produce output signals indicative of the positions of scintillations relative to the array of photomultipliers. The outputs of the circuits 20 are in the form of four coordinate output signals: $+x$, $-x$, $+y$, and $-y$. The relative strength of these four output signals indicates the positions of scintillations in the coordinate system of FIG. 1. A scintillation occurring at the origin of the coordinate system of FIG. 1 would occur directly above photomultiplier P10 and would create signals of equal strength at the output leads from circuit 20. The signals from circuits 20 are passed to a signal sorting means 22 which associates each of the signals according to finite two-dimensional sectors of the scintillation crystal 18. Each sector corresponds to only a single one of the samples 13 located proximate thereto. The number of sectors will vary depending upon how many samples are to be analyzed. For example, if an array of ten rows of samples 13 in which each row contains ten samples is to be analyzed, a large square could be envisioned inscribed within the perimeter 50 in FIG. 1. If this large square were subdivided into smaller squares, ten on a side, then the large area would be divided into one hundred small squares or sectors. If sectors were so defined by the signal sorting means 22, then the combination of the $+x$ and $-x$ signals would be classified in one of 10 categories. Similarly, the combined $+y$ and $-y$ signals would likewise fall within one of ten classes. These would then be one hundred unique combinations of $x$ categories and $y$ classes. Each such unique combination would correspond to a unique one of the aforesaid sectors into which the field of view of the scintillation camera could be divided. If a sample 13 were positioned directly above each such sector, then 100 samples could be concurrently analyzed.

It is to be understood that the only restrictions on the number of sectors which can be defined by the signal sorting means 22 are the intrinsic resolutions of the scintillation detector 10 and the diameter of the sample tubes 13. With the present state of the technology, resolution distances of ⅜ to ¼ of an inch are common, while sample tube diameters of 12 millimeters are typically employed in a number of laboratory and clinical applications. There are no limitations on the geometry of the sectors, nor must the sectors be conterminous, although this is the preferable configuration. In a case of sectors which are not coterminous, scintillations occurring between sectors would be regarded as not being reliably attributable to any one of the samples 13, and would therefore be disregarded.

The signal sorting means 22 also includes position to amplitude conversion means which is connected to a signal tabulating means and registration means in the form of a multi-channel analyzer 23. The multi-channel analyzer 23 counts the signals associated with each of the sectors, which in turn are each associated with a unique sample position. A gating pulse is required from the gate pulse former and pulse height analyzer 21 so as to discriminate against recordation of the pulses on the basis of energy. That is, background pulses or pulses from radioactive sources other than those contained in the tubes 13 would not be tabulated unless they coincidentally were of a pulse energy lying within a pulse amplitude window established to accept the pulses expected from the samples 13.

The embodiment of FIG. 2 is also equipped with a collimator 16 constructed of radiation opaque material, such as lead. Collimator 16 is interposed between the scintillation crystal 18 and the radioactive samples 13 and is held in place by the bolts which fasten the sample retaining means 15 to the steel casing 11. The collimator 16 defines an array of parallel spaced apertures 17 having axes perpendicular to the expansive planar faces of the crystal 18 and to the rectangular coordinate system of FIG. 1. The collimator 16 tends to absorb much of the radiation from the samples 13 other than that radiation traveling in a direction perpendicular to the planar base of the crystal 18, with the result that there is less likelihood of erroneous attribution of the output signals among the sample 13.

In the operation of the embodiment of FIG. 2, a removable tray 14 containing samples 13 is placed in the sample retaining means 15. This positions the samples in an ordered array at predetermined positions relative to the scintillation means 18 and exposes the scintillation means 18 to radiation from the samples 13 to generate light emissions in response to radiation striking the crystal 18 in order to produce output signals from the photodetectors P1 through P19. The multi-channel analyzer 23 is typically set to count output signals for a predetermined time. The output signals are classified by the signal sorting means 22 according to the position of the radioactive event associated therewith in order to identify the sample 13 in which each of the radioactive events originated. The multi-channel analyzer 23 thereafter tabulates separately the sorted output signals attributed to each of the samples.

If instead of the embodiment of FIG. 2, a totally conventional nineteen phototube scintillation camera is employed in combination with the sample retaining means which is required with any form of this invention, the output produced will be a photograph in which each of the samples 13 appears at an ascertainable location in the photograph. Such a conventional scintillation camera with photographic film positioned in optical communication with an oscilloscope screen is illustrated in some detail in U.S. Pat. No. 3,723,735. For example, the detector head of a scintillation camera was turned face up so that a 550 KeV collimator having 500 parallel aperatures in position on the detector head was physically located above the scintillation crystal assembly. Thereafter, a sample retaining means containing six rows and six columns of 12 mm diameter sample means was positioned with each of the 36 samples positioned directly above a collimeter aperture. The tubes were spaced at approximately ¾ inch intervals and each contained approximately one quarter of a milliliter of liquid with varying concentrations of the radioisotope cobalti-57. Photointegration of the tubes for a period of 9 minutes produced an image which clearly depicted each sample and its level of radioactivity relative to the other samples. A total number of approximately 13,000 gamma rays were recorded from all of the samples. The samples were again imaged for a total count of 8,000 gamma rays. Again, all but the least radioactive sources were clearly discernable. From this experiment it is apparent that proper collimation can produce even more favorable results which would reduce the counting time required for all samples to only a slightly more than that required to count a single sample.

A number of embodiments different from that of FIG. 2 may be employed pursuant to this invention. One such modification is schematically illustrated in FIG. 3. This embodiment depicts a sample analyzer for analyzing a plurality of samples 13 for radiactivity. This analyzer includes a plurality of separate scintillation crystal assemblies 35 each having uniform lateral dimensions and contiguously positioned in optical isolation from each other in a planar two dimensional array. A sample retaining means 14' is positioned relative to the scintillation crystal assemblies 35 for accommodating a plurality of separate and discrete samples 13 at spaced intervals from each other at predetermined stationary positions proximate to the crystal assemblies 35.

The spacing of said samples 13 from each other is coordinated with the lateral dimensions of the crystal assemblies 35 so that individual ones of said samples 13 are positioned proximate to individual ones of said crystal assemblies 13 in a one-to-one relationship. An array of photodetectors is provided with the photodetectors P8 through P12 corresponding to their indentically numbered counterparts in FIGS. 1 and 2. Each of the photodetectors is positioned in overlapping optical communication with at least a plurality of the crystal assemblies 35 to generate electrical signals from at least a plurality of photodetectors in response to each scintillation observed in the scintillations crystal assemblies 35 to provide positional information concerning each scintillation observed. Electrical circuit means are provided for establishing a plurality of coterminous spatial sectors of the area encompassed in the plane of the crystal assemblies 35 each such sector corresponding to the location of a single one of the crystal assemblies 35. This circuitry includes positional matrixing circuitry 20', and signal sorter 22'. A signal tabulation means 23' is also provided for concurrently tabulating the detection of radioactive events according to the sector of origin within which radioactive events from said samples cause light emissions in said crystals. In this manner the number of radioactive events detected from each of the aforesaid samples 13 are concurrently registered in the signal tabulator 23'

Figure 7:
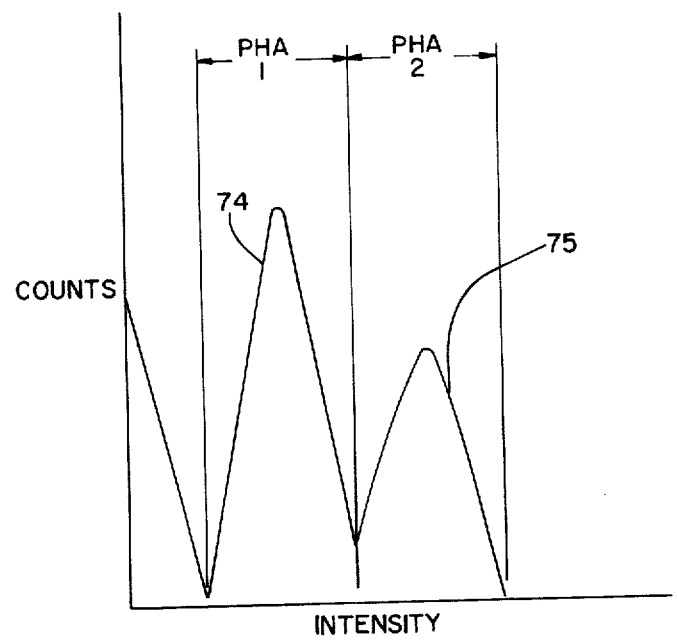
FIG. 7 is a diagram illustrating the correction feature of the embodiment of FIG. 3 for obtaining actual disintegration counts.

When the sample analyzer of FIG. 3 is to be employed for analyzing a plurality of separate samples for the presence of the radioisotope iodine-125, particular additional means may be employed to advantage. Iodine-125 disintegrates in a rather unique manner among radioisotopes. More specifically, an atom of iodine-125 decays by capturing electrons and by immediately thereafter emitting two X-rays having energies of 27.4 and 31 KeV, respectively. The emission of these X-rays reduces the atom to one of telurium in an excited state. The atom immediately leaves the excited state either by internal conversion of energy of a gamma ray or by emission of the gamma ray itself. The energy conversion involved in the decay of iodine-125 therefore results in the coincidence of a statistically constant portion of the energy releasing events as illustrated by the pulse height spectra of FIG. 7. That is, the energy peak 74 represents single events, either one or the other of the X-rays or a gamma ray, while the energy peak 75 represents coincident photon production in the crystal assemblies 35 from both the X-rays or from an X-ray and a gamma ray. The actual rate of disintegration of atoms of iodine-125 which produce the pulse amplitude peaks 74 and 75 can be determined from the relationship of the number of counts within each peak according to the equation $$N = (A_1 + 2A_2)^2/4A_2$$

where $A_1$ is the tabulated number of a scintillation within peak 74, $A_2$ is the tabulated number of scintillation within peak 75 and $N$ is the actual rate of disintegration of atoms of iodine-125. The derivation of this equation is given in detail in an article by James S. Eldridge and Peter Crowther "Absolute Determination of $I^{125}$ in Clinical Applications", *Nucleonics*, Vol. 22, No. 6, June, 1964, pages 56–59. The data manipulation required to achieve this computation is achieved through the use of pulse amplitude analyzers, PHA1 and PHA2, a computation means provided by calculator 36, and a pulse registration means 37. The pulse analyzers PHA1 and PHA2 analyze the electrical signal from the photodetectors after processing by the position matrix circuitry to determine separately the intensities of the observed scintillations under the pulse amplitude peaks 74 and 75. That is, analyzer PHA1 passes only those pulses within peak 74 while analyzer PHA2 accepts only those within peak 75. Thereafter, the calculator 36 determines the actual rate of radioactive disintegrations in each of the sectors based on the number of detected single events and the number of detected coincident radioactive events. The pulse register 37 then stores separately by sector of origin the number of the scintillations generating electrical pulses characteristic of the detection of single radioactive rays and the number of scintiallations generating electrical pulses characteristic of the detection of coincident radioactive rays, so that the actual number of disintegrations for each sector (and hence each sample 13) is registered in the signal tabulator 23'. This may be in lieu of or in addition to any raw data desired, such as the number of counts under the peak 74 from each sample 13.

Figure 4:
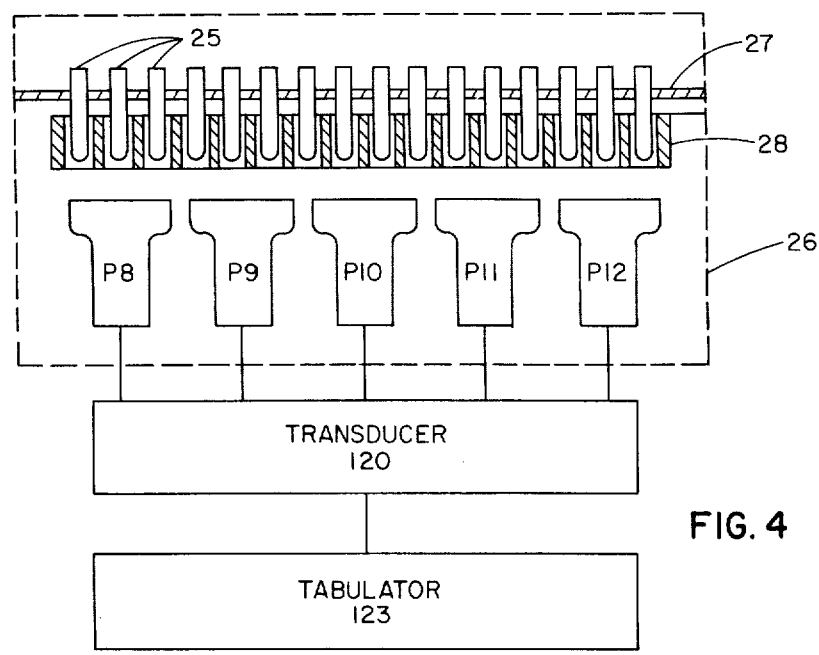
FIG 4 is an embodiment of the device of the present invention designed especially for analyzing liquid scintillation samples.

A further embodiment of the invention is illustrated in FIG. 4 which schematically depicts a detector 26 modified for use with liquid scintillation samples 25. As before, photodetectors P1 through P19 are positioned in an array with overlapping fields of view to produce electrical pulses in response to light scintillations. Photodetectors P8 through P12 only are illustrated for the sake of clarity. The scintillation means in the embodiment of FIG. 4 is the liquid scintillator in the liquid scintillation samples 25. Neither a crystal 18 nor a crystal array as in FIG. 3 is required and the photodetectors P1 through P19 view the samples 25 directly in an overlapping fashion. A sample retaining means 27 is fastened within detector 26 and is positioned in fixed relation with respect to the array of photodetectors and accommodates the liquid scintillation samples 25 at predetermined positions within a matrix. As in the other embodiments, a signal processing or transducing means 120 and signal tabulating means 123 are required for processing the photomultiplier signals. A collimator 28 of light opaque material is interposed about the samples 25 to prevent cross talk by virtue of light scintillations in one sample triggering light scintillations in adjacent samples. There is an aperture in the collimator 28 for each of the samples 25 to be measured.

Utilizing the detector 26 as illustrated in FIG. 4, the liquid scintillation samples 25, each containing a solvent, a scintillator, and a radioactive specimen are positioned at locations in the sample retaining means 27 with respect to the array of photodetectors. The photodetectors produce electrical output signals in response to light scintillations generated by the liquid scintillator material in the various samples 25. Each output signal is processed on the basis of the location of the radioactive event associated with the scintillation causing the electrical output signal. This is done in order to attribute each of the output signals to a particular one of the samples 25. As before, separate tabulation is conducted for the output signals attributed to each of the associated samples 25.

It may be desirable to associate an image intensification system with the liquid scintillation samples 25 in order to increase the strength of the scintillation generated. A variety of image intensifiers are known and may be used for this purpose. In such an arrangement, the image intensifier could be incorporated as part of the tube of sample 25 or added to the sample in liquid form or comprise an adaptation of a system such as that illustrated in U.S. Pat. No. 2,699,511.

Further modifications and alterations of the embodiments depicted will become obvious to those familiar with mass counting of radiactive samples. Accordingly, the embodiments of the devices depicted and the manner of performing the invention disclosed herein should not be considered as limited by the specific embodiments depicted for the purpose of explanation.

We claim:

1. A method of analyzing a plurality of separate samples for the presence of the radioisotope iodine-125 comprising positioning said samples in an array at spaced intervals from each other at predetermined stationary positions proximate to a plurality of separate scintillation crystals having uniform lateral dimensions and contiguously positioned in optical isolation from each other in a planar two dimensional array whereby the spacing of said samples from each other is coordinated with the lateral dimensions of said separate crystals so tat individual ones of said crystals in a one-to-one relationship, viewing said crystals with an array of photodetectors each of which is positioned in overlapping optical communication with at least a plurality of said crystals to generate electrical signals from at least a plurality of photodetectors in response to each scintillation observed in said scintillation crystals to provide positional information concerning each scintillation observed, establishing a plurality of coterminous spatial sectors of the area encompassed in the plane of the aforesaid two dimensional array each such sector corresponding to the location of a single one of the aforesaid crystals, concurrently tabulating the detection of radioactive events according to the sector of origin within which radioactive events from said samples cause light emissions in said crystals, thereby concurrently registering separately the number of radioactive events detected from each of the aforesaid samples, analyzing said electrical signals from said photodetectors to determine separately the intensities of the observed scintillations, tabulating separately those scintillations generating electrical pulses characteristic of the detection of single radioactive rays emitted by iodine-125 and those scintillations characteristic of the detection of coincident radioactive rays emitted by iodine-125, and calculating therefrom the actual rate of disintegration of atoms of iodine-125 occurring in each of the aforesaid samples.

2. The method of claim 1 wherein the actual rate of disintegration of atoms of iodine-125 is derived from the equation $$N = (A_1 + 2A_2)^2/4A_2$$

wherein $A_1$ is the tabulated number of scintillations characteristic of single radioactive rays emitted by iodine-125, $A_2$ is the tabulated number of scintillations characteristic of coincident radioactive rays emitted by iodine-125, and $N$ is the actual rate of disintegration of atoms of iodine-125.

* * * * *